United States Patent
Tanabe

(10) Patent No.: US 9,728,861 B2
(45) Date of Patent: Aug. 8, 2017

(54) REFLECTOR DEVICE, COMMUNICATION SYSTEM USING THE SAME AND COMMUNICATION METHOD USING THE SAME

(71) Applicant: NEC Corporation, Tokyo (JP)

(72) Inventor: Kosuke Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 14/428,607

(22) PCT Filed: Sep. 13, 2013

(86) PCT No.: PCT/JP2013/005441
§ 371 (c)(1),
(2) Date: Mar. 16, 2015

(87) PCT Pub. No.: WO2014/045557
PCT Pub. Date: Mar. 27, 2014

(65) Prior Publication Data
US 2015/0236429 A1 Aug. 20, 2015

(30) Foreign Application Priority Data
Sep. 18, 2012 (JP) .................................. 2012-204376

(51) Int. Cl.
*H01Q 15/14* (2006.01)
*H01Q 19/185* (2006.01)
(Continued)

(52) U.S. Cl.
CPC ............ *H01Q 19/185* (2013.01); *H01Q 1/24* (2013.01); *H01Q 1/42* (2013.01); *H01Q 15/14* (2013.01); *H01Q 15/246* (2013.01); *H04B 1/40* (2013.01)

(58) Field of Classification Search
CPC ........ H01Q 19/185; H01Q 15/14; H01Q 1/42; H01Q 15/246; H01Q 1/24; H04B 1/40
(Continued)

(56) References Cited

U.S. PATENT DOCUMENTS 6,587,246 B1   7/2003   Anderton et al.
7,633,425 B2 * 12/2009   Brown ................ F41H 13/0043
                                                315/5
(Continued)

FOREIGN PATENT DOCUMENTS

CN   101646956 A    2/2010
DE      700339 C   12/1940
(Continued)

OTHER PUBLICATIONS

Chinese Office Action issued by the State Intellectual Property Office of the People's Republic of China for Application No. 201380048671.9 dated Sep. 12, 2016 (19 pages).
(Continued)

*Primary Examiner* — Brian Young
(74) *Attorney, Agent, or Firm* — Wilmer Cutler Pickering Hale and Dorr LLP

(57) ABSTRACT

A reflector device having first and second reflector plates to which a reflective surface is attached, respectively, at a prescribed angle of inclination in relation to an axis of rotation, wherein the first reflector plate (1) and the second reflector plate are positioned so as to face one another, and the first reflector plate and/or the second reflector plate are/is capable of rotating around the axis of rotation.

15 Claims, 4 Drawing Sheets

(51) Int. Cl.
  *H01Q 1/24*   (2006.01)
  *H01Q 1/42*   (2006.01)
  *H01Q 15/24*  (2006.01)
  *H04B 1/40*   (2015.01)

(58) Field of Classification Search
  USPC ........................................ 343/912, 840, 839
  See application file for complete search history.

(56) References Cited

U.S. PATENT DOCUMENTS

| 9,500,749 | B2* | 11/2016 | Martin ................... G01S 19/14 |
| 9,503,171 | B2* | 11/2016 | Yeh ....................... H04B 7/0469 |
| 9,509,046 | B2* | 11/2016 | Nabar ..................... H01Q 3/40 |
| 2010/0119234 | A1 | 5/2010 | Suematsu et al. |

FOREIGN PATENT DOCUMENTS

| JP | H58-073205 A | 5/1983 |
| JP | H59-027605 A | 2/1984 |
| JP | H63-246040 A | 10/1988 |
| JP | H03-218480 A | 9/1991 |
| JP | H05-206946 A | 8/1993 |
| JP | H05-304410 A | 11/1993 |
| JP | H07-154320 A | 6/1995 |
| JP | H11-055028 A | 2/1999 |
| JP | 2007-299232 A | 11/2007 |
| WO | WO-00/14587 A1 | 3/2000 |

OTHER PUBLICATIONS

International Search Report corresponding to PCT/JP2013/005441 mailed Dec. 17, 2013 (2 pages).

Tomohiro Komai, "Passive Reflector to Reduce Fading due to Angle of Incidence Variations on Microwave Links", Journal of The Institute of Electronics, Information and Communication Engineers, B-II, vol. J74-B-II, No. 8, pp. 447-453, Aug. 1991.

Extended European Search Report issued by the European Patent Office for Application No. 13840045.2 dated May 2, 2016 (8 pages).

* cited by examiner

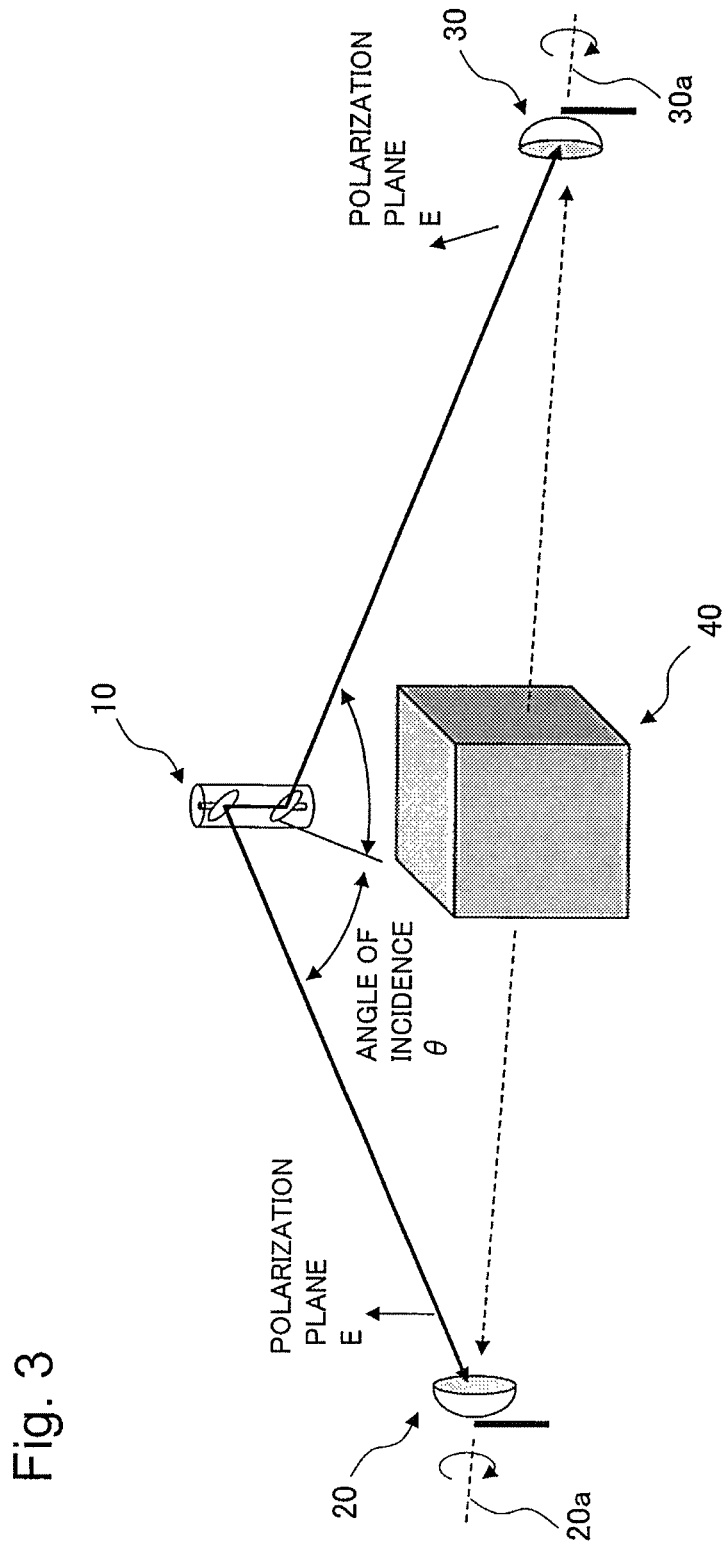

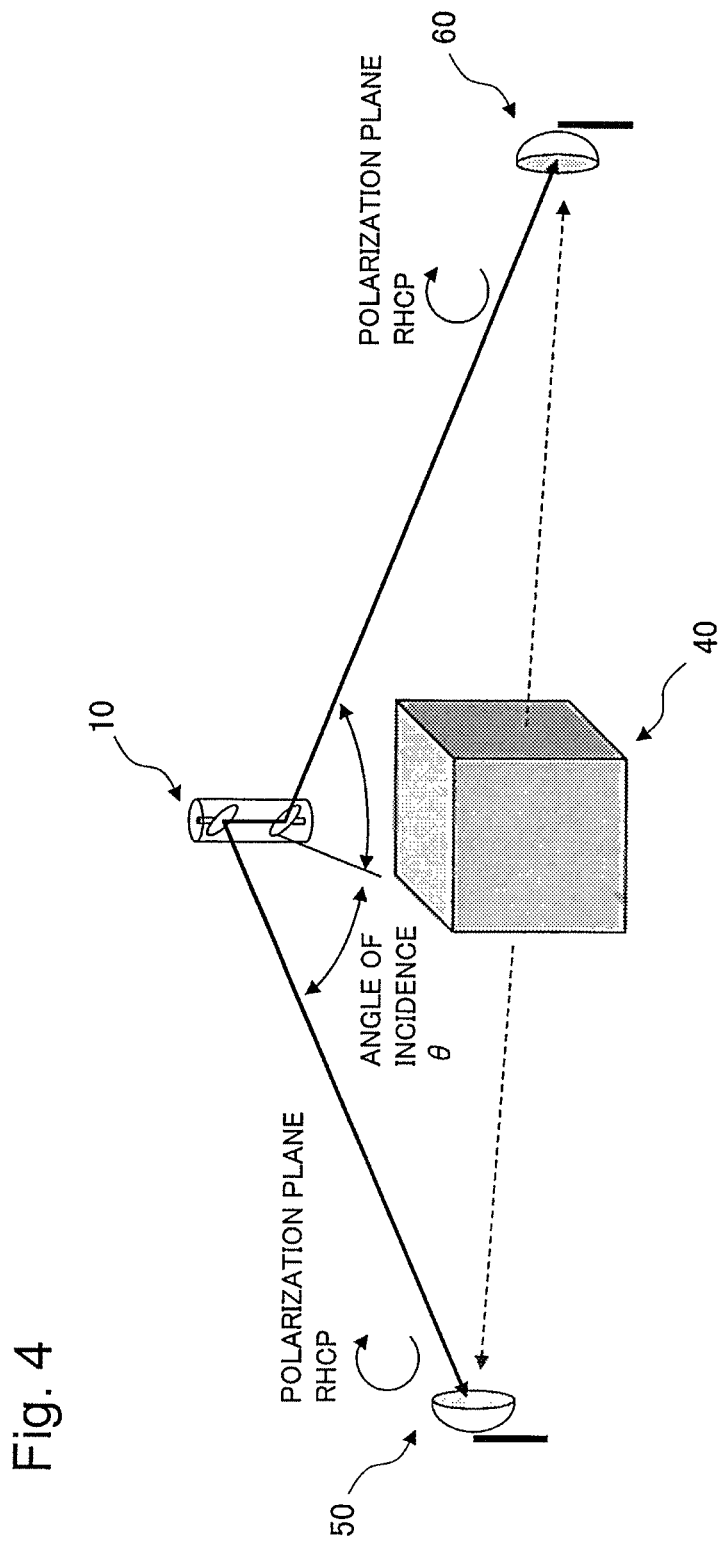

REFLECTOR DEVICE, COMMUNICATION SYSTEM USING THE SAME AND COMMUNICATION METHOD USING THE SAME

CROSS-REFERENCE TO RELATED APPLICATIONS

This application is a national stage application of International Application No. PCT/JP2013/005441 entitled "Reflector Device, Communication System Using the Same and Communication Method Using the Same," filed on Sep. 13, 2013, which claims the benefit of the priority of Japanese Patent Application No. 2012-204376, filed on Sep. 18, 2012, the disclosures of each of which are hereby incorporated by reference in their entirety.

TECHNICAL FIELD

The present invention relates to a reflector device, a communication system using the reflector device, and a communication method using the reflector device and, in particular, to a communication system and communication method that relay using reflection by a reflector device.

BACKGROUND ART

A point-to-point system that uses parabolic antennas is used as a mobile backhaul radio system. In order to provide good-quality communication, line of sight between antennas is required. In other words, in order to ensure line of sight, antennas need to be installed in elevated locations. Modern mobile station cells have been reduced to small cells such as picocells and femtocells. Consequently, base stations in urban regions need to be installed at lower locations. This poses a problem that line-of-sight environments cannot be ensured and that it makes it difficult to provide radio communication in point-to-point systems.

Patent Literature 1 (PTL1) proposes that a passive repeater made up of two antennas coupled back to back is provided at a midpoint between a transmitting antenna and a receiving antenna to prevent disconnections due to fading. The use of the repeater as described in Patent Literature 1 (PTL1) allows good-quality communication even when the angle of incidence is large. However, the passive repeater, which is made up of two antennas coupled back to back, has the problem of high cost because it requires two antennas.

A related technique that addresses the problem is a reflector relay method described in Non Patent Literature 1 (NPL1) which is a method for relaying microwaves between two points that are not on a direct line-of-sight path. Patent Literature 2 (PTL2) proposes that a reflector having two reflective surfaces that face each other at an angle of approximately 90 degrees is used as a relay station, one terminal station transmits a signal toward the reflector and the signal reflected by the two reflective surfaces is received at another terminal station. Patent Literature 3 (PTL3) proposes that a radio wave from a wireless base station is reflected by a curved reflector plate to eliminate blind regions in a mobile communication system. Patent Literature 4 (PTL4) proposes an RFID (radio frequency identification) communication system in which a reflector plate is attached to a motor shaft at an inclination angle to the motor shaft and an electromagnetic wave from an antenna is reflected toward an RFID tag by the reflector plate which rotates about the motor shaft.

Point-to-point systems can be provided in non-line-of-sight environments by using the repeater systems described in Patent Literatures 2 to 4 (PTL2 to PTL4) and Non Patent Literature 1 (NPL1).

CITATION LIST

Patent Literature

[PTL1] Japanese Laid-Open Patent Publication No. Sho 63-246040
[PTL2] Japanese Laid-Open Patent Publication No. Sho 58-73205
[PTL3] Japanese Laid-Open Patent Publication No. Hei 7-154320
[PTL4] Japanese Laid-Open Patent Publication No. 2007-299232

Non Patent Literature

[NPL1] Tomohiro Komai, "Passive Reflector to Reduce Fading due to Angle of Incidence Variations on Microwave Links", Journal of The Institute of Electronics, Information and Communication Engineers, B-II, Vol. J74-B-II, No. 8, pp. 447-453, August, 1991

SUMMARY OF INVENTION

Technical Problem

However, the related techniques described above have the following problems.

When any of the reflector plates proposed in Patent Literatures 2 to 4 (PTL2 to PTL4) and Non Patent Literature 1 (NPL1) is used, there is a problem that the cross-section of a radio wave arriving at a large angle of incidence is so small that it is difficult to provide good-quality communication. Conversely, the size of the reflector plates needs to be increased in order to provide good-quality communication.

An object of the present invention is to provide a reflector device that solves the above-described problem that it is difficult to provide good-quality communication at low cost by using a reflector plate in non-line-of-sight communication when the angle of incidence of a radio wave is large, and to provide a communication system using the reflector device and a communication method using the reflector device.

Solution to Problem

To achieve the object described above, a reflector device according to the present invention includes a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation.

A communication system using a reflector device according to the present invention includes: a reflector device including a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation;

a first antenna transmitting a radio wave to the reflective surface of the first reflector plate of the reflector device; and a second antenna receiving the radio wave reflected by the first reflector plate of the reflector device and then reflected by the reflective surface of the second reflector plate.

A communication method according to the present invention reflects a horizontally incident wave in a vertical direction as a first reflected wave, reflects the first reflected wave in a horizontal direction as a second reflected wave, and emits the second reflected wave in a direction that is not parallel to the incident wave.

A communication method using a reflector device according to the present invention is a communication method using: a reflector device including a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation;

a first antenna transmitting a radio wave to the reflective surface of the first reflector plate of the reflector device; and a second antenna receiving the radio wave reflected by the first reflector plate of the reflector device and then reflected by the reflective surface of the second reflector plate, wherein at least one of the first reflector plate and the second reflector plate of the reflector device is horizontally rotated to direct a radio wave to the first antenna and the second antenna;

a radio wave is transmitted from the first antenna to the reflective surface of the first reflector plate of the reflector device; and the radio wave reflected by the first reflector plate of the reflector device and further reflected by the reflective surface of the second reflector plate is received by the second antenna.

Advantageous Effects of Invention

The present invention can provide a reflector device that provides good-quality communication at low cost in non-line-of-sight communication using reflector plates even when the angle of incidence of radio waves is large, and a communication system using the reflector device and a communication method using the communication system.

BRIEF DESCRIPTION OF DRAWINGS

FIG. 3 is an external view for illustrating a communication system and a communication method that use the reflector device according to the first exemplary embodiment of the present invention.

FIG. 4 is an external view for illustrating a communication system and a communication method that use a reflector device according to a second exemplary embodiment of the present invention.

DESCRIPTION OF EMBODIMENTS

Preferred exemplary embodiments of the present invention will be described in detail with reference to drawings.

First Exemplary Embodiment

Figure 1:
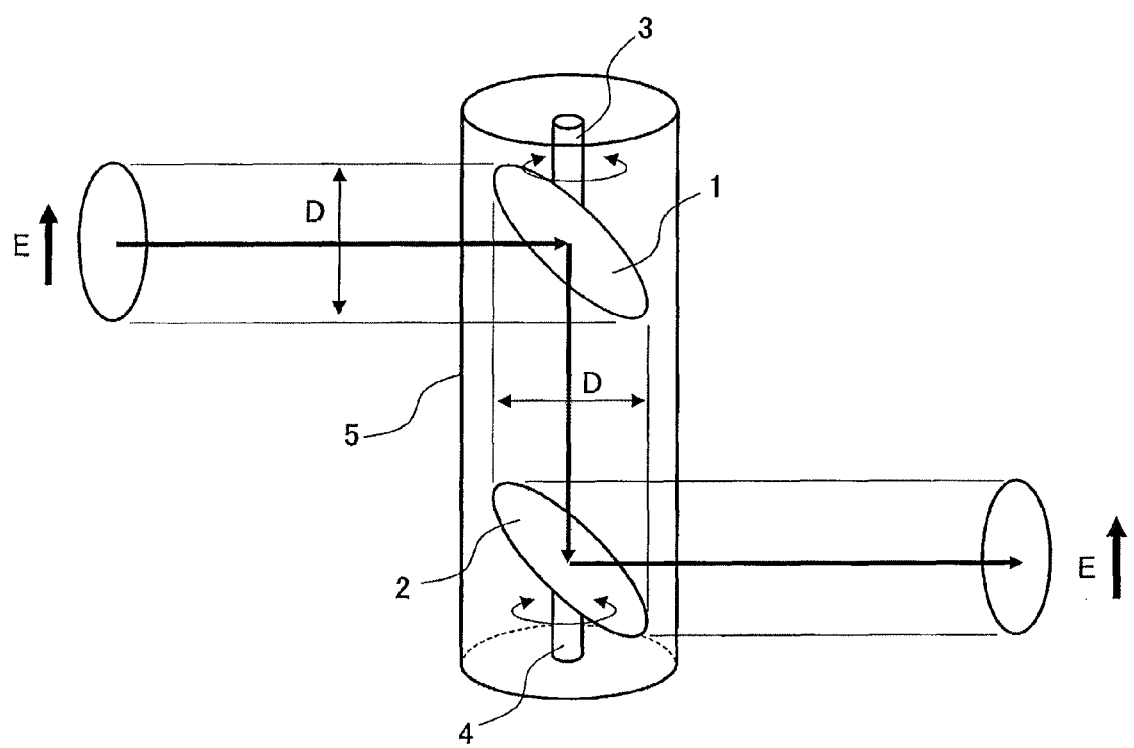
FIG. 1 is an external view of a reflector device according to a first exemplary embodiment of the present invention.
Figure 2:
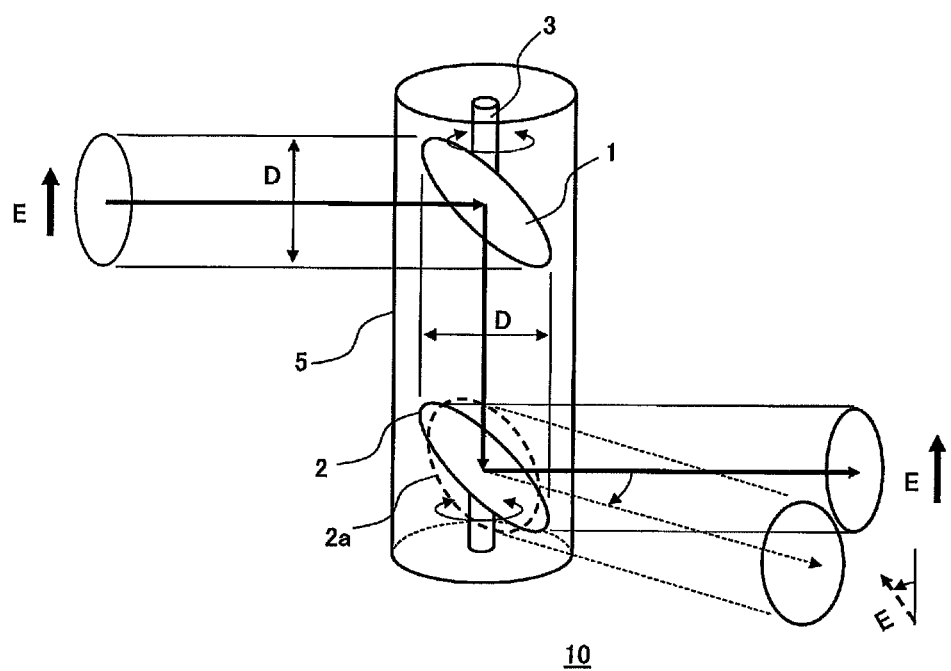
FIG. 2 is an external view for illustrating an operation of the reflector device in FIG. 1 in further detail.

A reflector device according to a first exemplary embodiment of the present invention, a communication system using the reflector device, and a communication method using the reflector device will be described first with reference to drawings. FIG. 1 is an external view of a reflector device according to the first exemplary embodiment of the present invention and FIG. 2 is an external view for illustrating an operation of the reflector device in FIG. 1 in further detail. FIG. 3 is an external view for illustrating a communication system and a communication method that use a reflector device according to the first exemplary embodiment of the present invention.

The reflector device 10 of this exemplary embodiment includes a first reflector plate 1 and a second reflector plate 2. The first reflector plate 1 and the second reflector plate 2 are attached at a predetermined inclination angle to an axis of rotation, have reflective surfaces, and are disposed in such a way that the reflective surfaces face each other. At least one of the plates is rotatable about the axis of rotation. The predetermined inclination angle in this exemplary embodiment is 45 degrees. The reflector device 10 further includes a first support 3 including a mechanism that horizontally rotates while keeping the inclination of the first reflector plate 1 at 45 degrees, a second support 4 including a mechanism that horizontally rotates while keeping the inclination of the second reflector plate 2 at 45 degrees, and a radome 5 housing the first reflector plate 1, the second reflector plate 2, the first support 3 and the second support 4.

The metal plate constituting the first reflector plate 1 is inclined at 45 degrees so that the first reflector plate 1 reflects a horizontal incident radio wave vertically downwards. The metal plate is elliptical in shape so that a cross section of the radio wave is circular as viewed from the direction of propagation. The second reflector plate 2 is a metal plate inclined at 45 degrees so that a radio wave reflected by the first reflector plate 1 and propagating vertically downward is reflected in the horizontal direction. The metal plate is elliptical in shape so that a cross section of the radio wave is circular as viewed from the direction of propagation.

The first support 3 includes a mechanism that horizontally rotates while keeping the inclination of the first reflector plate 1. The second support 4 includes a mechanism that horizontally rotates while keeping the inclination of the second reflector plate 2. The rotating mechanisms may be provided for both of the first support 3 and second support 4. Since the angular relation between the first reflector plate 1 and the second reflector plate 2 is relative, the rotating mechanism may be provided only for one of the first support 3 and the second support 4.

The radome 5 is cylindrical in shape, houses the first reflector plate 1, the second reflector plate 2, the first support 3 and the fourth support 4, and protects them from weather. The radome 5 is made of plastic resin such as FRP (fiberglass reinforced plastic) or polycarbonate.

An operation of the reflector device 10 of this exemplary embodiment will now be described. As illustrated in FIG. 1, a horizontally incident radio wave is reflected by the first reflector plate 1, propagates vertically downward, reflected by the second reflector plate 2 and propagates horizontally. The second reflector plate 2a horizontally rotated while keeping the inclination of the second reflector plate 2 at 45 degrees is represented by a dashed line in FIG. 2. In this setting, a radio wave which has been reflected by the first reflector plate 1, has propagated vertically downward, and has been further reflected by the second reflector plate 2, propagates as indicated by dashed lines in FIG. 2.

A communication system using a reflector device 10 as described above will be described. As illustrated in FIG. 3, the communication system includes a first antenna 20 transmitting a linearly-polarized radio wave to a reflector device 10 as illustrated in FIGS. 1 and 2 and a second antenna 30 receiving the linearly-polarized radio wave reflected by the reflector device 10. The first antenna 20 and the second antenna 30 are directional antennas such as parabolic antennas. In the reflector device 10, the plane of polarization of the linearly-polarized wave tilts in accordance with the reflection angle. Specifically, the plane of polarization of a linearly polarized radio wave reflected by the second reflector plate 2*a* horizontally rotated while the inclination is kept at 45 degrees as illustrated in FIG. 2 rotates with respect to the radio wave reflected by the second reflector plate 2 indicated by a solid line. The first antenna 20 and/or the second antenna 30 is provided with a polarization angle adjustment mechanism which adjusts the polarization angle of a linearly polarized wave in accordance with an inclination of the plane of polarization of the linearly-polarized wave in the polarizer device 10. An example of the polarization angle adjustment mechanism may rotate the first antenna 20 about an axis of rotation 20*a* parallel to the direction of maximum radiation of the mirror reflector of the antenna as illustrated in FIG. 3 to adjust the polarization angle and, after the adjustment, fix the first antenna 20. Similarly, the mechanism may rotate the second antenna 30 about an axis of rotation 30*a* parallel to the direction of maximum radiation of the mirror reflector of the antenna as illustrated in FIG. 3 to adjust the polarization angle and, after the adjustment, fix the second antenna 30. Such adjustment of the first antenna 20 and/or the second antenna 30 allows the polarization angle of a radio wave to be adjusted to enable communication.

A communication method using a reflector device 10 as described above will now be described. As illustrated in FIG. 3, the first reflector plate 1 and the second reflector plate 2 of the reflector device 10 are horizontally rotated to direct a radio wave to a first antenna 20 and a second antenna 30. Then, a linearly-polarized radio wave is transmitted from the first antenna 20. In the reflector device 10, the radio wave is reflected by the first reflector plate 1 in the vertical direction. The radio wave reflected in the vertical direction is transmitted again horizontally at the second reflector plate 2. In this process, the plane of polarization of the radio wave rotates at the first reflector plate 1 and the second reflector plate 2 in accordance with the direction of reflection. The radio wave whose plane of polarization has rotated is received at the second antenna 30. By adjusting the polarization angle beforehand by the polarization angle adjustment mechanism of at least one of the first antenna 20 and the second antenna 30, good-quality communication can be provided. On the other hand, when a radio wave is transmitted from the second antenna 30 and is received at the first antenna 20, communication is provided by an operation similar to the operation described above. The description of the operation will be omitted.

Design relating to the size of the first reflector plate 1 and the second reflector plate 2 of the reflector device 10 of this exemplary embodiment will be described. If the size D of a cross-section of the reflector plates that is perpendicular to the direction of incidence a radio wave is chosen to be equal to or greater than the first Fresnel radius, communication with a propagation loss equivalent to a distance approximately the same as the distance from the first antenna 20 to the second antenna 30 via the reflector device 10 can be provided. Specifically, let the distances from the reflector device to the antennas be denoted by d1 and d2, respectively, and the total distance be denoted by d=d1+d2, then the propagation loss L [dB] can be obtained according to the Friis transmission equation as:

$$L = +20 * \log_{10}((4\pi d)/\lambda) \text{ [dB]}$$

where $\lambda$ is free space wavelength.

When the size D is smaller than the first Fresnel radius, each reflector plate is approximately considered to be an antenna having diameter D and equivalent gains Gref1 [dBi] and Gref2 [dBi] are $$Gref1 = Gref2 = 20 * \log_{10}(\pi D/\lambda) \text{ [dBi]}$$

Propagation losses from the reflector device 10 to the first antenna 20 and the second antenna 30 can be written as $$L1 = -20 * \log_{10}(\pi D/\lambda) + 20 * \log_{10}((4\pi d1)/\lambda) \text{ [dB]}$$

$$L2 = -20 * \log_{10}(\pi D/\lambda) + 20 * \log_{10}((4\pi d2)/\lambda) \text{ [dB]}$$

and the total propagation loss is $$L = L1 + L2 \text{ [dB]}$$

For example, assume that the frequency is 60 GHz and d1=d2=200 m, then

L=approximately 120 [dB] for D=approximately 1.4 [m] and

L=137 [dB] for D=approximately 0.3 [m].

In this way, the size of reflector plates used in this exemplary embodiment can be chosen in accordance with required propagation loss values.

According to this exemplary embodiment, the angle of incidence $\theta$ of radio waves arriving at the reflector device 10 from the first antenna 20 or the second antenna 30 can be adjusted by rotating the first reflector plate 1 or the second reflector plate 2. On the other hand, the angle of incidence of radio waves at the first reflector plate 1 or the second reflector plate 2 is always 45 degrees. Thus, even when the angle of incidence $\theta$ is large, good-quality non-line-of-sight communication can be provided without increasing the area of the reflector plates.

In this way, in a non-line-of-sight environment where an obstacle 40 exists on the path between the first antenna 20 and the second antenna 30, the reflector device 10 is installed and radio waves are reflected so that the radio waves detour around the obstacle 40 to enable good-quality point-to-point communication. With the reflector plates according to the related techniques, communication is possible only when the angle of incidence is small, due to size constraints of the reflector plates. The reflector device 10 of this exemplary embodiment, in contrast, is capable of reflecting radio waves without using reflector plates with an increased size even when the angle of incidence $\theta$ is nearly 90 degrees.

According to this exemplary embodiment, a good-quality radio communication system can be implemented at low cost because a repeater with two antennas coupled back to back as in Patent Literature 1 (PTL1) is not used. Furthermore, since the first antenna 20 and/or the second antenna 30 is provided with a polarization angle adjustment mechanism that adjusts the polarization angle of a linearly-polarized wave, the polarization angle can be adjusted to allow polarization plane matching even when the polarization angle rotates at the time of reflection in the reflector device 10.

Second Exemplary Embodiment

A reflector device according to a second exemplary embodiment of the present invention, a communication system using the reflector device and a communication method using the reflector device will be described with reference to drawing. Elements similar to those of the first exemplary embodiment are given the same reference numerals and detailed description of those elements will be omitted. This exemplary embodiment is a different embodiment that uses a reflector device according to the first exemplary embodiment.

A communication system using such a reflector device 10 will be described. As illustrated in FIG. 4, the communication system includes a first antenna 50 which transmits a circularly polarized radio wave to a reflector device 10 illustrated in FIGS. 1 and 2, a second antenna 60 which receives a circularly polarized radio wave reflected at the reflector device 10. The first antenna 50 and the second antenna 60 are directional antennas such as parabolic antennas. The directional antennas in this exemplary embodiment are circularly polarized antennas.

A communication method using a reflector device 10 as the one described above will be described. As illustrated in FIG. 4, a first reflector plate and a second reflector plate of the reflector device 10 are horizontally rotated so as to direct radio waves to the first antenna 50 and the second antenna 60, respectively. Then, a circularly polarized wave, for example a right-handed circularly polarized (RHCP) radio wave is transmitted from the first antenna 50. In the reflector device 10, the radio wave is reflected by the first reflector plate 1 in the vertical direction. The radio wave reflected in the vertical direction is transmitted in the horizontal direction again at the second reflector plate 2. On the other hand, when a radio wave is transmitted from the second antenna 60 and received at the first antenna 50, communication is provided by an operation similar to the operation described above. The description of the operation will be omitted.

According to this exemplary embodiment, as in the first exemplary embodiment, the angle of incidence θ of radio waves arriving at the reflector device 10 from the first antenna 50 or the second antenna 60 can be adjusted by rotating the first reflector plate 1 or the second reflector plate 2. On the other hand, the angle of incidence of radio waves at the first reflector plate 1 or the second reflector plate 2 is always 45 degrees. Thus, even when the angle of incidence θ is large, good-quality non-line-of-sight communication can be provided without increasing the area of the reflector plates.

In this way, in a non-line-of-sight environment where an obstacle 40 exists on the path between the first antenna 50 and the second antenna 60, the reflector device 10 is installed and radio waves are reflected so that the radio waves detour around the obstacle 40 to enable good-quality point-to-point communication. With the reflector plates according to the related techniques, communication is possible only when the angle of incidence is small, due to size constraints of the reflector plates. In contrast, the reflector device 10 of this exemplary embodiment, like the reflector device 10 of the first embodiment, is capable of reflecting radio waves without using reflector plates with an increased size even when the angle of incidence θ is nearly 90 degrees.

According to this exemplary embodiment, a good-quality radio communication system can be implemented at low cost because a repeater with two antennas coupled back to back as in Patent Literature 1 (PTL1) is not used.

Moreover, a circularly polarized wave is used for a polarized wave of the directional antennas in this exemplary embodiment. In the first embodiment, the polarization angle adjustment mechanisms of the directional antennas are used to adjust polarization because the plane of polarization of polarized waves changes in accordance with the reflection angle of the radio waves in the reflector device 10. On the other hand, according to the second exemplary embodiment, the need for adjustment of polarization at the antennas can be eliminated because circular polarized wave is used.

While preferred exemplary embodiments have been described with reference to the drawings, the present invention is not limited to these exemplary embodiments. The novel technical features of the embodiments described above are summarized below. However, the present invention is not necessarily limited to these features.

(Supplementary Note 1) A reflector device including a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation.

(Supplementary Note 2) The reflector device according to Supplementary Note 1, further including a first support fixing the first reflector plate at the predetermined inclination angle, a second support fixing the second reflector plate at the predetermined inclination angle, a radome housing the first and second reflector plates and the first and second supports.

(Supplementary Note 3) The reflector device according to Supplementary Note 1, wherein the reflective surface of each of the first reflector plate and the second reflector plate is substantially elliptical in shape.

(Supplementary Note 4) The reflector device according to any one of Supplementary Notes 1 to 3, wherein the shape of each of the first reflector plate and the second reflector plate that is projected on a plane parallel to the axis of rotation is substantially circular.

(Supplementary Note 5) The reflector device according to any one of Supplementary Notes 1 to 4, wherein the predetermined angle is approximately 45 degrees.

(Supplementary Note 6) A communication system using a reflector device according to any one of Supplementary Notes 1 to 5, the communication system including a first antenna transmitting a radio wave to the reflective surface of the first reflector plate of the reflector device and a second antenna receiving the radio wave reflected by the first reflector plate of the reflector device and then reflected by the reflective surface of the second reflector plate.

(Supplementary Note 7) The communication system according to Supplementary Note 6, wherein the first antenna transmits a linearly polarized radio wave and at least one of the first antenna and the second antenna includes a polarization angle adjustment mechanism adjusting a polarization angle of linear polarization.

(Supplementary Note 8) The communication system according to Supplementary Note 6, wherein the radio wave transmitted by the first antenna is a circularly polarized wave and the radio wave received by the second antenna is a circularly polarized wave.

(Supplementary Note 9) A communication method using a reflector device reflecting a horizontally incident wave in a vertical direction as a first reflected wave, reflecting the first reflected wave in a horizontal direction as a second reflected wave, and emitting the second reflected wave in a direction that is not parallel to the incident wave.

(Supplementary Note 10) A communication method using:

a reflector device including a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation;

a first antenna transmitting a radio wave to the reflective surface of the first reflector plate of the reflector device; and a second antenna receiving the radio wave reflected by the first reflector plate of the reflector device and then reflected by the reflective surface of the second reflector plate;

wherein at least one of the first reflector plate and the second reflector plate of the reflector device is horizontally rotated so as to direct radio waves to the first antenna and the second antenna, a radio wave is transmitted from the first antenna to the reflective surface of the first reflector plate, the radio wave reflected by the first reflector plate of the reflector device and further reflected by the reflective surface of the second reflector plate is received by the second antenna.

(Supplementary Note 11) The communication method according to Supplementary Note 10, wherein the first antenna transmits a linearly polarized radio wave and at least one of the first antenna and the second antenna includes a polarization angle adjustment mechanism adjusting a polarization angle of linear polarization.

(Supplementary Note 12) The communication method according to Supplementary Note 10, wherein the radio wave transmitted by the first antenna is a circularly polarized wave and the radio wave received by the second antenna is a circularly polarized wave.

It would be understood that the present invention is not limited to the exemplary embodiments described above and various modifications are possible within the scope of the present invention defined in the claims and it is needless to say that those modifications also fall within the scope of the present invention.

This application is based upon and claims the benefit of priority from Japanese patent application No. 2012-204376, filed on Sep. 18, 2012, the disclosure of which is incorporated herein in its entirety by reference.

REFERENCE SIGNS LIST

1 First reflector plate
2 Second reflector plate
3 First support
4 Second support
5 Radome
10 Reflector device
20, 50 First antenna
30, 60 Second antenna
20a, 30a Axis of rotation
40 Obstacle

The invention claimed is:

1. A reflector device comprising a first reflector plate and a second reflector plate to each of which a reflective surface is attached at a predetermined inclination angle to an axis of rotation,
   wherein the first reflector plate and the second reflector plate are positioned to face one another, and the first reflector plate and the second reflector plate are rotatable about the axis of rotation, and
   wherein the axis of rotation for the first reflector plate and the axis of rotation for the second reflector plate lie in the same straight line.

2. A reflector device comprising a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation, further comprising:
   a first support fixing the first reflector plate at the predetermined inclination angle;
   a second support fixing the second reflector plate at the predetermined inclination angle; and
   a radome housing the first and second reflector plates and the first and second supports.

3. A reflector device comprising a first reflector plate and a second reflector plate to each of which a reflective surface is attached at a predetermined inclination angle to an axis of rotation,
   wherein the first reflector plate and the second reflector plate are positioned to face one another, and at least one of the first reflector plate and the second reflector plate is rotatable about the axis of rotation, and
   wherein the reflective surface of each of the first reflector plate and the second reflector plate is substantially elliptical in shape.

4. A reflector device comprising a first reflector plate and a second reflector plate to each of which a reflective surface is attached at a predetermined inclination angle to an axis of rotation,
   wherein the first reflector plate and the second reflector plate are positioned to face one another, and at least one of the first reflector plate and the second reflector plate is rotatable about the axis of rotation, and
   wherein the shape of each of the first reflector plate and the second reflector plate that is projected on a plane parallel to the axis of rotation is substantially circular.

5. A reflector device comprising a first reflector plate and a second reflector plate to each of which a reflective surface is attached at a predetermined inclination angle to an axis of rotation,
   wherein the first reflector plate and the second reflector plate are positioned to face one another, and at least one of the first reflector plate and the second reflector plate is rotatable about the axis of rotation, and
   wherein the predetermined angle is approximately 45 degrees.

6. A communication system comprising:
   a reflector device comprising a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation;
   a first antenna transmitting a radio wave to the reflective surface of the first reflector plate of the reflector device; and
   a second antenna receiving the radio wave reflected by the first reflector plate of the reflector device and then reflected by the reflective surface of the second reflector plate.

7. The communication system according to claim 6, wherein the first antenna transmits a linearly polarized radio wave and at least one of the first antenna and the second antenna comprises a polarization angle adjustment mechanism adjusting a polarization angle of linear polarization.

8. The communication system according to claim 6, wherein the radio wave transmitted by the first antenna is a circularly polarized wave and the radio wave received by the second antenna is a circularly polarized wave.

9. The reflector device according to claim 1, at least one of the first reflector plate and the second reflector plate is fixed at the predetermined inclination angle.

10. The reflector device according to claim 9, further comprising a first support fixing the first reflector plate at the predetermined inclination angle.

11. The reflector device according to claim 9, further comprising a second support fixing the second reflector plate at the predetermined inclination angle.

12. A communication method using the reflector device according to claim 1, the reflector device reflecting a horizontally incident wave in a vertical direction as a first reflected wave, reflecting the first reflected wave in a horizontal direction as a second reflected wave, and emitting the second reflected wave in a direction that is not parallel to the incident wave.

13. A communication method using:
a reflector device comprising a first reflector plate and a second reflector plate to each of which a reflective surface is attached at a predetermined inclination angle to an axis of rotation, wherein the first reflector plate and the second reflector plate are positioned to face one another, and at least one of the first reflector plate and the second reflector plate is rotatable about the axis of rotation;
a first antenna transmitting a radio wave to the reflective surface of the first reflector plate of the reflector device; and
a second antenna receiving the radio wave reflected by the first reflector plate of the reflector device and then reflected by the reflective surface of the second reflector plate;
wherein at least one of the first reflector plate and the second reflector plate of the reflector device is horizontally rotated to direct a radio wave to the first antenna and the second antenna, a radio wave is transmitted from the first antenna to the reflective surface of the first reflector plate, the radio wave reflected by the first reflector plate of the reflector device and further reflected by the reflective surface of the second reflector plate is received by the second antenna.

14. The communication method according to claim 13, wherein the first antenna transmits a linearly polarized radio wave and at least one of the first antenna and the second antenna includes a polarization angle adjustment mechanism adjusting a polarization angle of linear polarization.

15. The communication method according to claim 13, wherein the radio wave transmitted by the first antenna is a circularly polarized wave and the radio wave received by the second antenna is a circularly polarized wave.

* * * * *